(12) United States Patent
Berton (10) Patent No.: US 8,671,889 B2
(45) Date of Patent: Mar. 18, 2014

(54) PET LEASH

(75) Inventor: Joseph Michael Berton, Tampa, FL (US)

(73) Assignee: Berton Enterprises, LLC, Tampa, FL (US)

( * ) Notice: Subject to any disclaimer, the term of this patent is extended or adjusted under 35 U.S.C. 154(b) by 0 days.

(21) Appl. No.: 13/533,701

(22) Filed: Jun. 26, 2012

(65) Prior Publication Data

US 2013/0000566 A1 Jan. 3, 2013

Related U.S. Application Data

(60) Provisional application No. 61/502,668, filed on Jun. 29, 2011.

(51) Int. Cl.
*A01K 29/00* (2006.01)

(52) U.S. Cl.
USPC ............................................ 119/796; 119/794

(58) Field of Classification Search
USPC .................. 119/796, 794, 797, 798, 860, 792
See application file for complete search history.

(56) References Cited

U.S. PATENT DOCUMENTS

| | | | | |
|---|---|---|---|---|
| 3,139,299 A | * | 6/1964 | Bowen | 294/1.4 |
| 4,383,710 A | * | 5/1983 | Fehr | 294/1.4 |
| 4,485,971 A | * | 12/1984 | Pajevic | 239/289 |
| 4,863,108 A | * | 9/1989 | Mitchell | 241/168 |
| 5,992,690 A | | 11/1999 | Tracy | |
| 6,077,362 A | | 6/2000 | Reed | |
| 6,861,249 B1 | | 3/2005 | Kent | |
| 6,886,499 B2 | | 5/2005 | Meissner | |
| 7,506,615 B1 | * | 3/2009 | Sansone et al. | 119/867 |
| D622,454 S | * | 8/2010 | Levy et al. | D30/153 |
| 7,819,088 B2 | | 10/2010 | Stern | |
| 7,909,942 B2 | * | 3/2011 | Wood | 134/115 R |
| D635,725 S | | 4/2011 | Levy et al. | |
| 7,992,525 B1 | * | 8/2011 | Fisher | 119/860 |
| 8,001,933 B2 | | 8/2011 | Robley et al. | |

(Continued)

FOREIGN PATENT DOCUMENTS

| | | |
|---|---|---|
| EP | 1401265 | 6/2002 |
| WO | WO 2006/069436 | 7/2006 |

OTHER PUBLICATIONS

"Absolutely New Hydro Handle" (2012) http://www.buy.com/prod/absoluteleynew-hydro-handle/219029900.html.

(Continued)

*Primary Examiner* — Yvonne Abbott
(74) *Attorney, Agent, or Firm* — Weaver Austin Villenueve & Sampson LLP (57) ABSTRACT

A pet leash apparatus includes a housing, a spool enclosed within the housing, and a container attached to the housing, configured to store a volume of liquid solvent. The spool is configured to store and dispense a leash, the leash configured to be extendable from the housing in a first direction, and retractable into the housing by way of the spool. The spool configured to be actuated by a first control arrangement mounted on the housing. The container is coupled to an inlet of an orifice by way of a valve, the valve configured to be actuated by a second control arrangement, the orifice including an outlet to the exterior of the housing. The housing is configured to be handheld; and actuation of the valve releases a directed spray of liquid solvent through the orifice in a second direction.

19 Claims, 5 Drawing Sheets

(56) References Cited

U.S. PATENT DOCUMENTS

| | | | |
|---|---|---|---|
| 8,418,659 B2* | 4/2013 | Harruna | 119/796 |
| 2006/0249537 A1 | 11/2006 | Goldberg | |
| 2007/0261645 A1 | 11/2007 | Van de Merwe et al. | |
| 2008/0173257 A1 | 7/2008 | Steiner et al. | |
| 2010/0206246 A1* | 8/2010 | Waldrep | 119/796 |
| 2011/0120388 A1 | 5/2011 | Shahbaz | |
| 2011/0139090 A1 | 6/2011 | Harruna | |
| 2012/0186539 A1* | 7/2012 | Johnston | 119/796 |

OTHER PUBLICATIONS

"Bags on Board Retractable Dog Leash with Built-in Bag Dispenser—Large: Black #3203911101—Retractable Dog Leads" (2012) http://www.petazon.com/price/product/Bags-on-Board-Retractable-Leash-Size-Large-Black.html.

"Flexi Dog Leash Light" (2012) http://www.drsfostersmith.com/1/1/4335-flexi-dpg-leash-light.html.

Kho, Nancy D. (2011) "Eco-Friendly Disposal of Dog Waste: Bag or Flush?" *SF Gate*. Web.

Maixner, Jean. (2009) "Dog Waste Polluting Washington's Beautiful Watershed." *ACCESS for Pet Health*.

"Misting Dog Leash" (2012) http://www.amazon.com/Hyperdog-Misting-Dog-Leash/dp/B005EXQING.

Watson, Traci (2002) "Dog Waste Poses Threat to Water" *USA Today*. Web.

\* cited by examiner

PET LEASH

CROSS-REFERENCE TO RELATED APPLICATION

The present patent application claims the priority benefit of commonly owned U.S. provisional patent application 61/502,668, filed Jun. 29, 2011, entitled "Pet Leash", which is hereby incorporated by reference in its entirety into the present patent application.

TECHNICAL FIELD

This disclosure relates to an extendable and retractable pet leash, more particularly to an apparatus including a pet leash and a pet waste dispersal system within a common housing.

BACKGROUND OF THE INVENTION

A domestic animal, such as a dog, requires period "walking" by an owner or other caretaker, in order to give the animal exercise and to allow the animal to urinate and defecate in an outdoor location. In urban and suburban environments, an ordinance typically requires the animal to be walked only while leashed, whereas "clean-up" ordinances generally require the animal's caretaker to take responsibility for removing defecated fecal matter, or "droppings". Bags, scoops and the like are known that allow a pet owner to clean up droppings after the animal has completed defecation.

This is known to be a messy and disagreeable proposition for the animal's caretaker. Consequently, noncompliance with the clean-up ordinance is a frequent occurrence. The unremoved droppings become an unsightly nuisance and hazard for pedestrians. More importantly, the droppings can pose a significant environmental and health problem, because they are eventually transported into storm drains and/or a watershed where they are known, in the aggregate, to release significant amounts of hazardous pathogens, including *E. coli* bacteria, fecal coliform bacteria, *salmonella* and *giardia*.

Furthermore, even when the droppings are promptly cleaned up by the animal's caretaker (typically, by collecting the droppings in a plastic bag) the plastic bag is frequently deposited by the caretaker into a street-side waste receptacle or home garbage container. As a result, the droppings become an unpleasant nuisance and/or biohazard to those involved in subsequent processing of municipal garbage, and/or a significant landfill pollutant. Thus, significant environmental problems are associated with animal droppings, whether or not they are attended to in compliance with the clean-up ordinance.

The nature and magnitude of the above mentioned problems are further described in the following references, the disclosures of which are hereby incorporated into the present application in their entireties: Watson, Traci, "Dog waste poses threat to water, USA Today, Jun. 6, 2002; Maixner, Jean, "Dog Waste Polluting Washington's Beautiful Watershed, Seattle PI, Jun. 16, 2009; Kho, Nancy Davis, "Eco-friendly disposal of dog waste: bag or flush?", San Francisco Chronicle, Nov. 13, 2011.

Improved techniques for cleaning up the droppings of domestic animals are therefore desirable.

SUMMARY OF INVENTION

The present inventor has appreciated that a pet leash apparatus that integrates a retractable pet leash and a pet waste dispersal system with a common housing that is configured to be handheld may provide a convenient, environmentally friendly means by which an animal caretaker can clean up the animal's droppings. As a result, compliance with clean-up ordinances is made easier and the environmental impact of the droppings is reduced.

In an embodiment, the pet leash apparatus includes, mounted to the common housing, a retractable and extendable pet leash, and the pet waste dispersal system. A spool, enclosed within the housing may be configured to store and dispense the pet leash. The leash may be configured to be extendable from the housing in a first direction, and be retractable into the housing by way of the spool. The spool may be configured to be actuated by a first control arrangement mounted on the housing. The pet waste dispersal system may include a container, enclosed within or attached to the housing, configured to store a volume of liquid solvent. The container may be coupled to an inlet of an orifice by way of a valve. The valve may be configured to be actuated by a second control arrangement mounted on the housing. The orifice may include an outlet to the exterior of the housing. Actuation of the valve may release a directed spray of the liquid solvent through the orifice in a second direction.

In an embodiment, the liquid solvent maybe discharged through the orifice such that the liquid solvent effectively disintegrates animal droppings from a standoff distance. The standoff distance may be at least three feet, for example. The orifice may be a Venturi nozzle. The second direction may be substantially different from the first direction. The volume of liquid solvent may be in the range of approximately 10 to 30 ounces. The container may have an initial pressure in the approximate range of 8-25 PSIG. The apparatus may be configured to continuously pressurize the liquid solvent at a pressure in the approximate range of 8-25 PSIG. The directed spray of the liquid solvent may have a flow rate in the range of 20 to 40 ounces per minute.

In an embodiment, the container may include a self-pressurizing elastic bladder. Alternatively, or in addition, the apparatus may include a battery powered motor for pressurizing the container.

In an embodiment, the liquid solvent may be water.

In a further embodiment, a pet leash maybe configured such that a common housing, configured to be handheld, encloses a fluid container and a spool. The spool may be configured to store and dispense the pet leash. The pet leash may be configured to be extendable from the housing in a first direction, and retractable into the housing by way of the spool. The spool may be configured to be actuated by a first control arrangement mounted on the housing; the fluid container may be configured to store a volume of liquid solvent, and may be coupled to an inlet of an orifice by way of a valve. The valve may be configured to be actuated by a second control arrangement mounted on the housing; the orifice including an outlet to the exterior to the housing, an outlet. Actuation of the valve may release a directed spray of the liquid solvent through the nozzle outlet in a second direction substantially different from the first direction.

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

As used herein, the term "leash" refers generally to, without limitation, any mechanism attached to the neck or other portion of an animal for restraint or control, such as e.g., retractable lines, tethers or harnesses.

As used herein, the term "animal" refers generally to any ambulatory non-human species including, for example, canines, felines, domestic animals, and simians.

Figure 1:
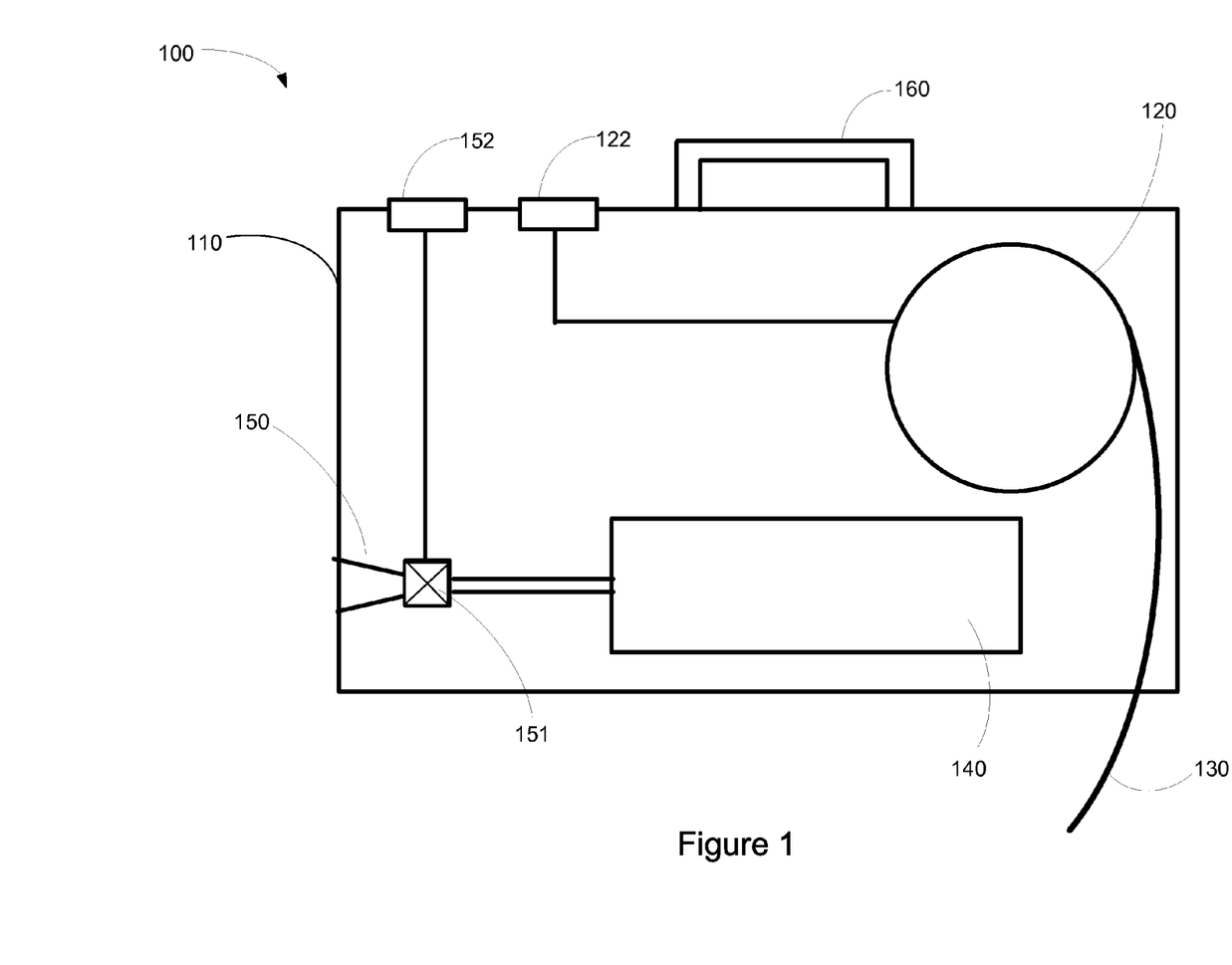
FIG. 1 shows a block diagram of an example leash apparatus.

The present inventor has appreciated that a leash apparatus may advantageously include a retractable and extendable leash, and an animal waste dispersal system integrated with a common housing, configured to be handheld. Referring to FIG. 1, a block diagram of an example leash apparatus is presented. Leash apparatus 100 may include spool 120 enclosed within housing 110. Spool 120 may be configured to store and dispense leash 130. Leash 130 may be configured to be extendable from the housing in a first direction, and retractable into the housing by way of spool 120. Spool 120 may be configured to be actuated by first control arrangement 122. Control arrangement 122 may be mounted on housing 110. Container 140 may be configured to store a volume of liquid solvent. The liquid solvent may be, for example, water. Container 140 may be, as illustrated, enclosed within housing 110; in some embodiments, however, container 140 may disposed outside housing 110 and be attached, for example, to a fitting on the exterior of housing 110. Container 140 may be coupled, directly or indirectly, to an inlet of orifice 150 by way of valve 151. Valve 151 may be configured to be actuated by second control arrangement 152. Orifice 150 may include an outlet to the exterior of the housing. Advantageously, housing 110 may be configured to be handheld by way, for example, of handle 160. In an embodiment, actuation of valve 151 releases a directed spray of the liquid solvent through orifice 150 in a second direction.

The volume and operating pressure of container 140, and characteristics of orifice 150, for example, may be selected such that a stream of the liquid solvent emitted from orifice 150 is capable of substantially breaking up and dissolving ("disintegrating") an animal dropping from a standoff distance. Advantageously, the standoff distance may be at least three feet. By "disintegrating", as the term is used herein, and in the claims, is meant that the dropping is substantially liquefied and/or broken into such small particulates that they may be readily absorbed into ordinary garden soil, sand, loam or turf.

Using the presently disclosed techniques, the dropping and associated pathogens may be returned to the earth immediately after an animal's defecation, and at the location of the defecation, where they may be absorbed and neutralized by local organic processes. Thus, the dropping and associated pathogens are prevented from posing a biological hazard and environmental risk to watersheds and landfills. Moreover, the present techniques obviate the need for the animal caretaker to manually handle, or even closely approach, the dropping.

In one example, the liquid solvent may include water with added biological and/or chemical agents that assist in the disintegration and/or decomposition of the dropping and/or sterilization or sanitization of the dropping. For example, the following additives may be included in the water as a solution or suspension: a protease, amylase, lipase, galactosidase, lactase, glucoamylase, invertase, pectinase, bromelain or a combination of the two or more of these. For example, one-half teaspoon of a commercial pet or septic system product, such as BioGuard Plus 1 (BioGuard Plus is a tradename used by RuShay USA, Inc.) may be added prior to filing container 140 with water. Such products may contain enzymes, and anaerobic cultures in a dry powder form, including protease, amylase, lipase and cellulase. In another example, no adjuvant additives may be added to the water or other liquid solvent.

In an embodiment, container 140 may be configured as an elastic bladder, such as a neoprene rubber bladder or latex bladder formed from a length of tube, for example. The elastic bladder may be provided in a metal or polymer container, such as a fiber reinforced polymer container, for example. In an embodiment, the volume of liquid contained by container 140 may be selected in a range from 18 to 50 ounces. Advantageously, a volume of 20 to 30 ounces may be selected, for example. Such a volume of fluid is not inconveniently heavy for a handheld leash apparatus, and has been found to be a sufficient volume to disintegrate animal droppings from, at least, household pets.

In one example, container 140 may be removably mounted to housing 110, which may be configured to allow a user to select from a range of container sizes. In such implementations, for example, a user planning to walk a large dog may select a container 140 having a volume in a range from 30 to 50 ounces, while a user planning to walk a small dog may select a container 140 having a volume in a range from 18 to 24 ounces.

The orifice may include a nozzle. The nozzle may be selected to direct a stream of liquid within a designated range of velocity from the pressurized container to a desired distance from the nozzle. In one example, the nozzle is a propelling nozzle having a convergent portion. For example, referring now to FIG. 2 the nozzle may be a Venturi nozzle. Using Bernoulli's equation for incompressible flows, the theoretical pressure drop at the constriction of the Venturi nozzle shown in FIG. 2 is given by:

$(p1-p2)=\rho(v_2^2-v_1^2)/2$, where $\rho$ is the density of the fluid, $v_1$ is the (slower) fluid velocity where the pipe is wider, $v_2$ is the (faster) fluid velocity where the pipe is narrower.

Figure 2:
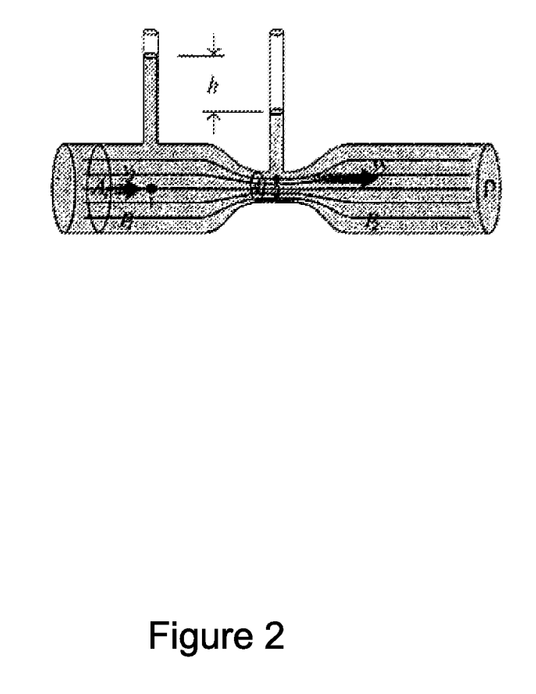
FIG. 2 shows an example of a Venturi nozzle.

Referring still to FIG. 2, pressure drop, $p_1-p_2$, is indicated by a differential in the fluid head, $\Delta h$. A Venturi nozzle may be used to increase the velocity of a liquid provided that a pressure drop is available. In an embodiment, a nozzle may be used that has a pressure drop of about 5-15 pounds per square inch (psi). Advantageously, a pressure drop in the range of 6-12 psi, for example 9 psi, may be provided. Alternatively, an orifice may be formed as an orifice plate or the like. The pressure in container 140 may be about 6-40 psi, for example. Advantageously the pressure may in the range of 8-25 psi, for example.

Figure 3:
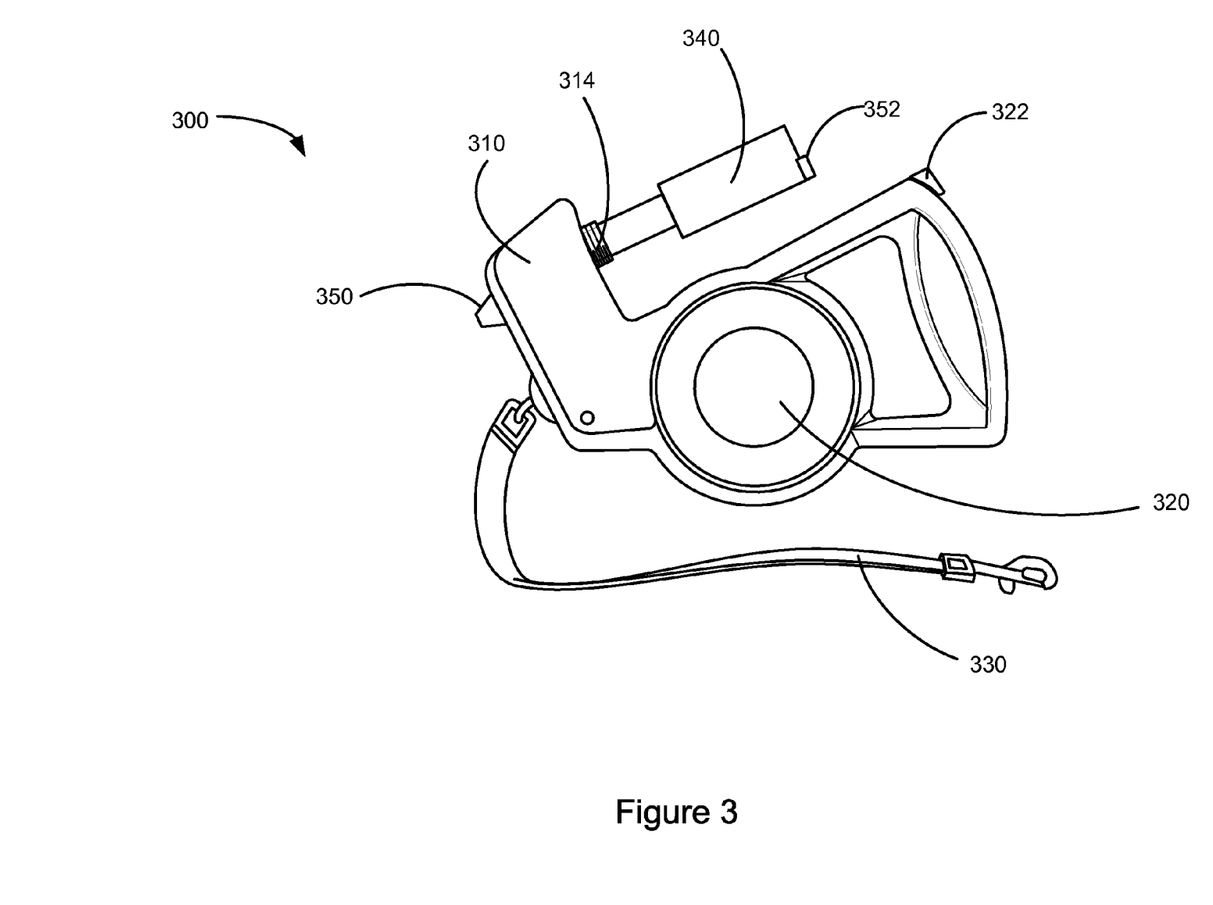
FIG. 3 shows an example of a leash apparatus according to an embodiment.

Referring now to FIG. 3, leash apparatus 300 may include spool 320 enclosed within housing 310. Spool 320 may be configured to store and dispense leash 330. Leash 330 may be configured to be extendable from the housing in a first direction, and retractable into the housing by way of spool 320. Spool 320 may be configured to be actuated by first control arrangement 322. Container 340 may be configured to store a volume of liquid solvent, and be detachably connected to housing 310 by way of, for example, threaded connector 314.

The present inventor has discovered that a surprisingly small volume of liquid solvent may be sufficient to effectively disintegrate animal droppings of, at least, conventional household pets. For example, container 340 may include a tubular bladder having a one-quarter inch inner diameter, a one eighth inch thickness of the tube wall, and a one-half inch outer diameter, when not filled with water. More generally, a small inner diameter may be desirable to avoid excessive amounts of air. Alternatively, a highly compressible, elastic foam material may be placed around the tubular material to cause it to collapse when empty, pushing any air out of the tube. When the tube is filled with liquid, then the tube expands and displaces the highly compressible, elastic foam material. In one example, containers were tested with volume of 16, 20, 22, 24 and 28 ounce capacities. The lowest volume, 16 ounces, was determined to be sufficient for disintegrating droppings of a small adult dog.

Container 340 may be coupled to an inlet of orifice 350 by way of a valve (not shown). The valve may be configured to be actuated by second control arrangement 352. Housing 310 may be configured to be handheld by way of, for example, handle 360.

The present inventor found that a number of types of tubes were unsatisfactory, due to rupture, failure to achieve adequate pressure, lack of longevity, and lack of sufficient volume of liquid in a reasonable length of tubing. Highly elastic tubing, such as latex rubber and neoprene rubber, however, were found to be satisfactory. For example, a volume of about 20 ounces of liquid solvent was found to be sufficient to disintegrate the droppings from a medium-sized dog. A range of latex tube sizes provided sufficient volume and pressure, including tubes having wall thicknesses from one sixteenth to one quarter of an inch. Advantageously, the thickness of tubing may be selected to be about one eighth of an inch thick. The length of the tubing may be selected to provide a sufficient volume within the container, such as a length of 3 to 8 inches or, advantageously, 4 to 7 inches.

Figure 4:
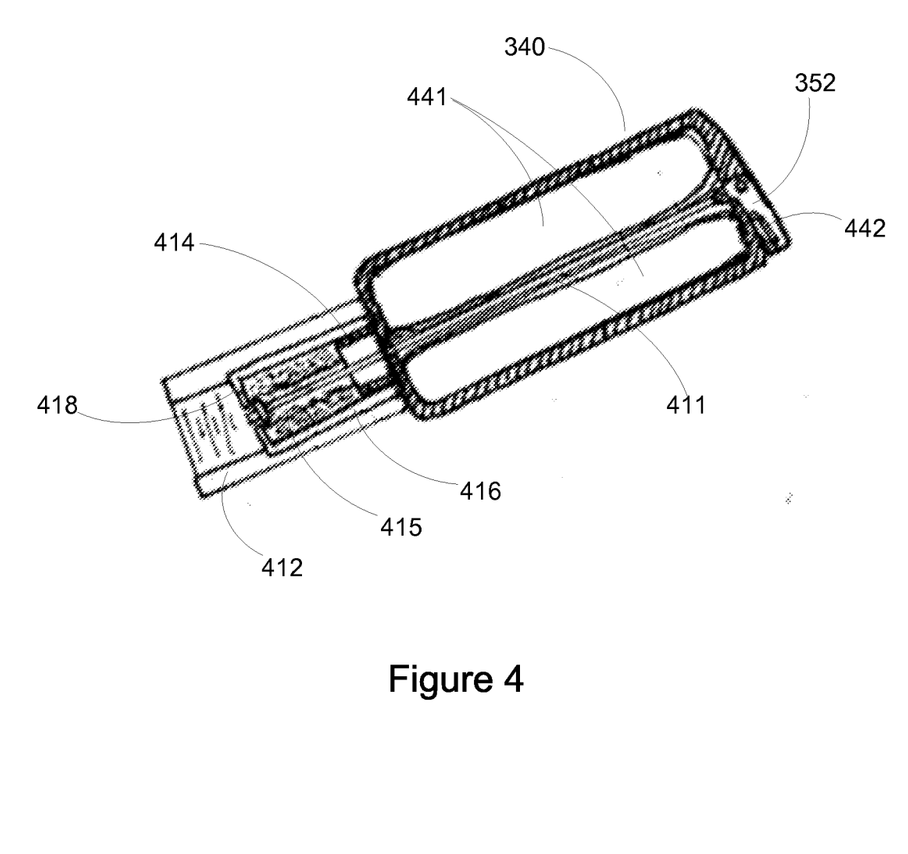
FIG. 4 shows an example of a liquid solvent container according to an embodiment.

Alternatively, referring now to FIG. 4, container 340 may house a bladder or bladders 441 and may include a compressible fluid, such as air or nitrogen within the bladder that is compressed during filling by the volume of water. The diameter and length of a cylindrically shaped container may be selected to provide a sufficient volume for the volume of liquid required for disintegrating animal droppings at a particular standoff distance.

For example, a stream distance of from 3 to 15 feet may be obtained by a bladder 441 including, for example a 5.5 inch long, ⅛th inch wall thickness, latex tube housed in a cylindrically shaped capsule having an inner diameter of 3 inches, providing 21.5 fluid ounces of liquid, such as illustrated in FIG. 4, for example. In the example shown in FIG. 4, container 340 may be removable and replaceable, allowing a plurality of containers to be carried, and/or the selection of a variety of container volumes to be employed with the same housing 310

Referring again to FIG. 3, orifice 350 may be coupled by a fluid passage (not shown) with container 440. Orifice 350, which in some embodiments may include a nozzle, may be configured to direct a stream of liquid solvent toward a target animal dropping. Threaded connector 314 may provide a coupling mechanism to the removable container 340. Container 340 may include second control arrangement 352.

Referring now to FIG. 4, second control arrangement 352 may be attached to release mechanism 411 that may be biased closed by a biasing mechanism 441. Biasing mechanism 441 may include a spring, for example. Release mechanism 411 may mate at one end to check value 418 of insert 416. In an embodiment, insert 416 may contain dry additives 415, for example. Insert 416 may be coupled with water fill end 414 of container 340.

In one example, additives 415 may include enzymes and/or microbial cultures and may be provided for inclusion with water when filling container 340. In this case, when connector 412 is connected to a hose, an outdoor faucet or other water tap, enzymes and/or microbial cultures may be deposited into container 340 during filling. The reservoir may have a check valve 418, seal or the like. Check valve 418 may prevent back flow of the enzymes or microbial cultures into household plumbing, for example. Insert 416 may be removed after filling of the container and may be disposable or refillable. If refillable, the user may return the 416 for refill and/or replacement. Dry additives 415 may include amylase, protease, cellulase, lipase, pectinase, keratinase and other enzymes, microbes, antimicrobials or a combination of two or more of these that provide such enzymes and microbes/antimicrobials to break down and/or sanitize fecal matter more rapidly than could be accomplished with water alone.

Container 340 may be coupled to housing 310, by, for example, engaging connector 312 of container 340 to threaded connector 314 of leash apparatus 300. When second control arrangement 352 is actuated, water or other liquid solvent may be released through check valve 418 to be directed by orifice 350 toward the target animal dropping at sufficient flow rate, stream velocity and volume to disintegrate the animal dropping. Additives 315 may help to sanitize and/or break down fecal matter and/or pathogens, for example.

Figure 5:
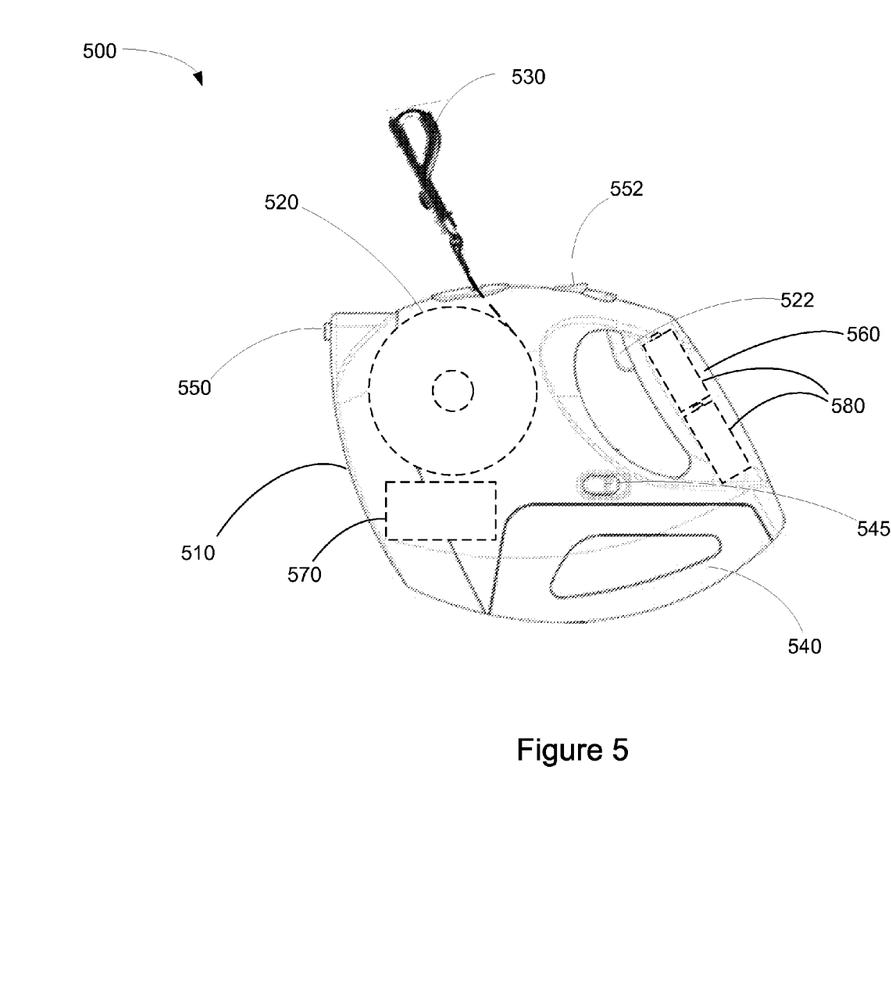
FIG. 5 shows an example of a leash apparatus according to a further embodiment.

Referring now to FIG. 5, a further example embodiment is illustrated. Leash apparatus 500 includes spool 520 and container 540, both enclosed within housing 510. Spool 520 may be configured to store and dispense at least a portion of leash 530. Leash 530 may be configured to be extendable from the housing in a first direction, and retractable into the housing by way of spool 520. Spool 520 may be configured to be actuated by first control arrangement 522. Control arrangement 522 may be mounted on housing 510. Container 540 may be configured to store a volume of liquid solvent. The volume for example of container 540 may be in the approximate range of 10 to 30 ounces, for example. Container 540 may be coupled to an inlet of orifice 550 by way of a valve (not illustrated). The valve may be configured to be actuated by second control arrangement 552. Orifice 550 may include an outlet to the exterior of the housing. Advantageously, housing 510 may be configured to be handheld by way, for example, of handle 560. In an embodiment, actuation of a valve (not illustrated) releases a directed spray of the liquid solvent through orifice 550 in a second direction. In an embodiment, the directed spray may have a flow rate in the approximate range of 20 to 40 ounces per minute. Advantageously, the second direction may be substantially different from the first direction.

Advantageously, container 540 may be detachably connected to housing 510. For example, release button 545 may be configured such that actuation of release button 545 enables removal of container 540 for refilling, cleaning, etc.

As described above in connection with FIG. 4, container 540 may be configured to cooperate with an insert or other reservoir (not illustrated) that contains additives 415. Additives 415 may include enzymes and/or microbial cultures and may be provided for inclusion with water when filling container 540. Dry additives 415 may include amylase, protease, cellulase, lipase, pectinase, keratinase and other enzymes, microbes, antimicrobials or a combination of two or more of these that provide such enzymes and microbes/antimicrobials to break down and/or sanitize fecal matter more rapidly than could be accomplished with water alone.

Container 540 may be self-pressurized by, for example, an ullage volume of air or other gas that becomes pressurized when liquid is added to the container. In addition to, or instead of such self-pressurization, an active pressurization arrangement may be contemplated. In the embodiment illustrated in FIG. 5, for example, pump motor 570 may be configured provide a desired pressure within container 540. Pump motor 570 may be an electrical motor driven, for example, by batteries 580. Batteries 580 may be stored within handle 560, for example.

Thus, a pet leash apparatus that integrates a retractable pet leash and a pet waste dispersal system has been described. While various embodiments have been described herein, it should be understood that they have been presented by way of example only, and not limitation. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus comprising:
   a housing;
   a spool, enclosed within the housing and configured to store and dispense a leash, the housing configured with a leash exit oriented in a first direction, the leash configured to be retractable into the housing onto the spool, the spool configured to be actuated by a first control arrangement mounted on the housing;
   a container, attached to the housing, configured to store a volume of liquid solvent, the container coupled to an inlet of an orifice by way of a valve, the valve configured to be actuated between an open position and a closed position by a second control arrangement, the orifice including an outlet to the exterior of the housing, wherein
   the housing is configured to be handheld; and
   actuation of the valve to the open position releases a directed spray of the liquid solvent through the orifice in a second direction, the second direction being substantially different from the first direction.

2. The apparatus of claim 1, wherein the liquid solvent is discharged through the orifice such that the liquid solvent effectively disintegrates animal droppings from a standoff distance.

3. The apparatus of claim 2, wherein the standoff distance is at least three feet.

4. The apparatus of claim 1, wherein the orifice is a Venturi nozzle.

5. The apparatus of claim 1, wherein the volume of liquid solvent is in the range of approximately 10 to 30 ounces.

6. The apparatus of claim 1, wherein the container has an initial pressure in the approximate range of 8-25 PSIG.

7. The apparatus of claim 6, wherein the apparatus is configured to continuously pressurize the liquid solvent at a pressure in the approximate range of 8-25 PSIG.

8. The apparatus of claim 1, wherein the directed spray of the liquid solvent has a flow rate in the range of 20 to 40 ounces per minute.

9. The apparatus of claim 1, wherein the container includes a self-pressurizing elastic bladder.

10. The apparatus of claim 1, further comprising a battery powered motor for pressurizing the container.

11. The apparatus of claim 1, wherein the liquid solvent is water.

12. A pet leash, wherein:
    a common housing, configured to be handheld, encloses a fluid container and a spool, the spool configured to store and dispense the pet leash, the housing configured with a pet leash exit oriented in a first direction, the pet leash configured to be retractable into the housing onto the spool;
    the spool is configured to be actuated by a first control arrangement mounted on the housing;
    the fluid container, configured to store a volume of liquid solvent, is coupled to an inlet of an orifice by way of a valve, the orifice including an outlet to the exterior of the housing;
    the valve is configured to be actuated between an open position and a closed position by a second control arrangement mounted on the housing; and
    actuation of the valve to the open position releases a directed spray of the liquid solvent through the nozzle outlet in a second direction substantially different from the first direction.

13. The pet leash of claim 12, wherein the liquid solvent is discharged through the nozzle such that the liquid solvent effectively disintegrates pet feces from a standoff distance of at least three feet.

14. The apparatus of claim 12, wherein the volume of liquid solvent is in the range of approximately 10 to 30 ounces.

15. The apparatus of claim 12, wherein the container has an initial pressure in the approximate range of 8-25 PSIG.

16. The apparatus of claim 15, wherein the apparatus is configured to continuously pressurize the liquid solvent at a pressure in the approximate range of 8-25 PSIG.

17. The apparatus of claim 12, wherein the directed spray of the liquid solvent has a flow rate in the range of 20 to 40 ounces per minute.

18. The apparatus of claim 12, wherein the fluid container includes a self-pressurizing elastic bladder.

19. The apparatus of claim 12, further comprising a battery powered motor for pressurizing the fluid container.

* * * * *